Sept. 8, 1970 J. N. MONROE 3,527,535

FINGERPRINT OBSERVATION AND RECORDING APPARATUS

Filed Nov. 15, 1968 2 Sheets-Sheet 1

JOHN N. MONROE
INVENTOR.

BY Ralph L. Cadwallader

Lawrence F. Kopfleisch

ATTORNEYS.

JOHN N. MONROE
INVENTOR.
BY
ATTORNEYS.

United States Patent Office 3,527,535
Patented Sept. 8, 1970

3,527,535
FINGERPRINT OBSERVATION AND RECORDING APPARATUS

John N. Monroe, Hollywood, Calif., assignor, by mesne assignments, to EG & G, Inc., Bedford, Mass., a corporation of Massachusetts Filed Nov. 15, 1968, Ser. No. 776,076
Int. Cl. G06k *9/08;* G01b *11/00, 9/08*
U.S. Cl. 356—71 8 Claims

ABSTRACT OF THE DISCLOSURE

An internal reflecting optical prism with two nonparallel, plane faces defining an acute angle. The prism is illuminated internally by directing light into a side, in a direction substantially parallel to the two faces, so that when a finger contact is made with one of the two faces, the fingerprint may be observed or photographed through the other of the two faces as a bright illuminated image of the fingerprint against a dark background.

This invention relates to apparatus for observing and recording fine relief patterns on a surface such as fingerprints.

Fingerprints uniquely identify the individual. Not only is the ridge arrangement on every finger of every human being unique, but the arrangement does not alter with growth. Because of its simplicity and economy, the practice of utilizing fingerprints as a means of identification, referred to as dactyloscopy, has become established as an indispensable aid to modern law enforcement.

Heretofore, fingerprints have been recorded by the well known technique of placing the finger with a wet ink surface and then pressing the finger against a piece of white paper. Other more elaborate techniques employ prisms or slabs of glass against which the finger is placed, then illuminated internally and photographed or observed. Techniques of this last-mentioned sort are described in U.S. Pats. 2,579,961, 3,174,414 and 3,200,701.

The latter two patents employ prisms having an internal total reflection face on which the finger is placed. This face is directly illuminated through a second face and the reflected illumination is observed through a third face. The total reflection is substantially reduced where the ridges of the finger contact the prism face because the ridges are observed as a dark pattern against a light background. As a result, when the print is photographed, the greatest part of the picture (the background) is highly exposed while the information (the ridges) is represented by underexposed areas. This situation is not preferred and is avoided to some extent in Pat. 2,579,961 which was issued Dec. 25, 1951 to J. E. Popma.

In all of the above mentioned patents it should be noted that rays from the source of illumination are projected directly onto the underside of the surface on which the finger rests. Additionally, in the Popma patent, 2,579,961, the ridges of the finger which contact a glass slab cause diffused reflection which is directed to a camera so situated that other reflected radiation is not intended to reach the camera. However, this patent suffers from the same defect as the others because of the ridges of the fingerprint appear light and the background is intended to appear dark to the camera.

One difficulty with the system in Pat. 2,579,961 is that other radiation than that diffusely reflected where the ridges of the finger touch, is reflected out to the camera. The reason for this is that the Popma configuration does not suppress spurious diffused, or scattered, light and allows such unwanted light to be efficiently transmitted to the camera film. Some scattering will necessarily occur at a number of points on the surfaces of the illuminated glass slab due to the presence of dust and other foreign particles in contact with the surfaces. Once scattering has occurred, and in the absence of any means for suppressing its propagation, some of the diffused light will be directly and efficiently transmitted through the glass to the camera by multiple reflections in the total internally reflecting medium. The fact that the illumination source radiates directly onto the surface on which the finger rests together with the large glass surface areas in Popma combine to produce a considerable amount of scattered light which may enter the camera and serve to reduce contrast between the illuminated finger ridges and the desired dark background.

It is an object of the present invention to provide apparatus for observing and/or recording a fingerprint, wherein difficulties encountered with prior systems are avoided.

A specific object of the present invention is to provide fingerprint observing and/or recording apparatus in which reduction in background contrast caused by spurious scattered light being directly transmitted by multiple internal reflections is eliminated.

It is another object to provide apparatus for observing and/or recording fingerprints without the use of ink and which will photograph rolled prints as well as stationary prints.

It is another object to provide apparatus which accomplishes any of the foregoing objects and in which optical distortion of the image of the fingerprint is eliminated.

The features of the invention which are believed to be novel are set forth with particularity in the appended claims. The invention itself, however, both as to its organization and method of operation, together with further objects and advantages thereof, may best be understood by reference to the following description of the embodiments taken in conjunction with the accompanying drawings.

Figure 1:
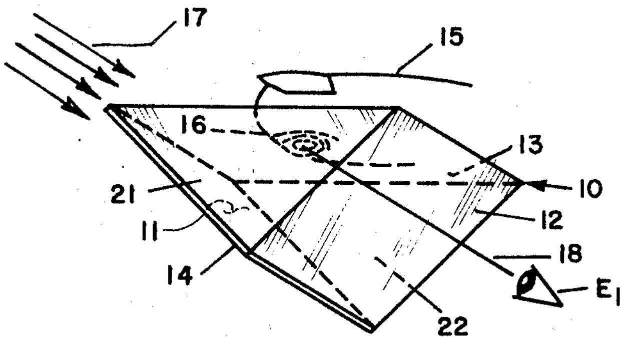
FIGS. 1 and 2 are perspective views of apparatus for observing fingerprints incorporating features of the invention.
Figure 2:
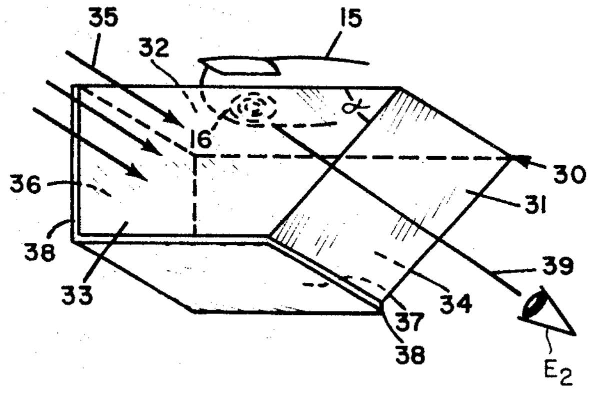
Figure 4:
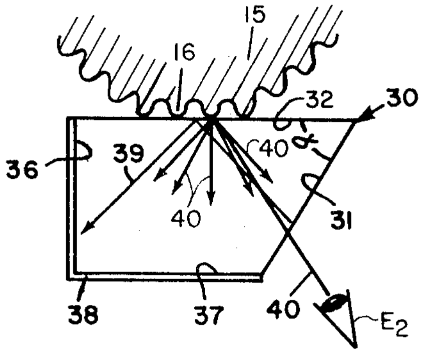

FIGS. 1 and 2 each show perspective views of prisms which can be used in the practice of the present invention. Each shows a prism of glass or other transparent material which has one surface against which the finger is placed, the prism being internally substantially totally reflective for light along an optical path to an observer. This surface meets another surface, through which the fingerprint is observed, forming an acute angle therebetween. These surfaces are clearly nonparallel. Other surfaces are coated with light absorbing (non-reflective) material.

Prism faces at the end of the two nonparallel faces admit light to the prism so that the light is substantially parallel to the two faces or inclined only slightly thereto. As a result, substantially all the illuminating light which enters the prism and impinges first on one of these nonparallel faces will exit through an end of the prism or impinge on one of the remaining faces of the prism. The remaining faces are coated with light absorbing material.

However, where the ridges of the finger touch the one face to form an interface, the illuminating light will be diffusely reflected and will exit the prism along the path to the observer.

Thus, the points where the ridges touch will appear white (light) and the background and spaces between ridges will appear black (no light). In other words the observer sees substantially only light which is diffusively reflected inside the prism. Light which is not absorbed or reflected diffusively within the prism will not leave through the face through which the observation is made, because it is incident on this face at a very small angle and substantially totally reflects therefrom.

In FIG. 1 triangular prism 10 has three nonparallel faces 11, 12 and 13. One of the nonparallel faces, 11, is coated with non-reflective light absorbing coating 14. Finger 15 is placed in contact with face 13 and ridges 16 of the finger (the fingerprint) is viewed through face 12 by the observer at E1. Coating 14 may be a homogeneous black paint of substantially the same index of refraction as the prism material and is sufficiently dense so that no light is admitted to prism 10 through face 11.

Illumination is provided from a source of light (not shown). This source produces light rays, indicated by arrows 17, which are directed into the prism through at least one of the side faces 21 and 22. Rays 17 are shown being directed to prism 10 through side face 21 so that rays 17 are substantially parallel or inclined only slightly to the three parallel faces 11, 12 and 13. Thus, light which is not diffusively reflected internally from one of these faces and which is not absorbed, strikes face 22 which transmits it to the outside. If prism 10 is illuminated only through face 21, then face 22 may be coated to absorb light.

The prism angles may be selected so the observer at E1 views along line 18, through face 12. Light traveling along this line is substantially totally reflected by face 13 (except where a finger ridge contacts this face). This being the case, all such light entering prism 10 through face 12 will be totally reflected to absorbing face 11. Similarly, light entering prism 10 through face 13 will be substantially totally reflected by face 12 to absorbing face 11.

Figure 3:
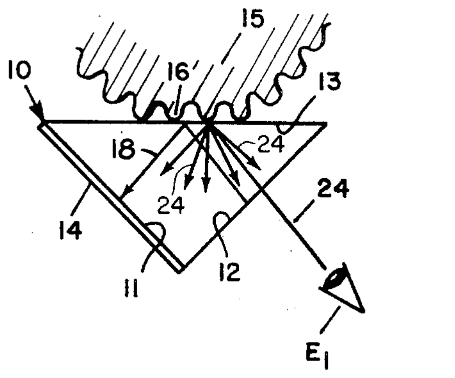
FIGS. 3 and 4 are optical schematics of the prism arrangements in FIGS. 1 and 2, respectively, as an aid to understanding the principles of the invention incorporated therein.
Figure 5:
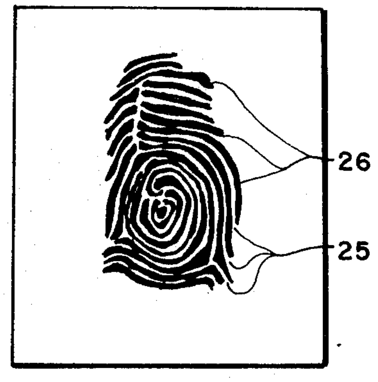
FIG. 5 is a fingerprint, as observed with the apparatus in FIG. 1 or 2.

These characteristics of prism 10 are illustrated in FIG. 3 which is an optical diagram to explain the phenomena. Light traveling along path 18 may enter the prism through any of the faces and is totally internally reflected at face 13 so as to impinge on face 11 and be absorbed. In other words, due to total internal reflection from face 13, along line 18, the observer at E1 will normally see only face 11 which is black except where total reflection is destroyed on face 13 by ridges 16 of finger 15. These areas will diffusively reflect light 24 out face 12 to the observer. Thus, only ridges 16 on finger 15, which define the fingerprint (and scars), will appear illuminated and visable through face 12 and the spaces between ridges 16 and the background will appear as black as face 11. The appearance of the fingerprint against this background is illustrated in FIG. 5 wherein ridges 25 of the finger are illuminated and appear white against the dark background 26.

The prisim in FIG. 2 serves the same function as prism 10 in FIG. 1 for revealing ridges 16 of a fingerprint on finger 15. Here, prism 30 has two nonparallel faces 31 and 32 subtending an angle $\alpha$ and end faces 33 and 34 which are parallel and perpendicularly disposed with respect to faces 31 and 32. Light rays 35 are admitted into prism 30 in the direction shown by the arrows, preferably at no more than a slight angle to faces 31 and 32, through at least one of the faces 33 or 34, from any convenient source (not shown). Faces 36 and 37 are provided, just as face 11 in FIG. 1, with coating 38 so as to absorb all light incident on them.

Angle $\alpha$, between faces 31 and 32, together with the refractive index of the material of prism 30, are such that face 32 totally reflects light along line 39. Thus, an observer E2 located along line 39 sees only faces 36 and 37 which will appear black except where the total reflection from face 32 is destroyed by ridges 16. This occurs just as in FIG. 1 where, for example, the ridges 16 of finger 15 touch face 32 to form an interface therewith producing a reflection at these points that is diffused. The diffused reflection 40 is substantially the only part of the incident illumination 35 that escapes through face 31 to the observer at E2.

A suitable value for $\alpha$ is 50° for which the index of refraction should be at least $\sqrt{2}$.

Figure 6:
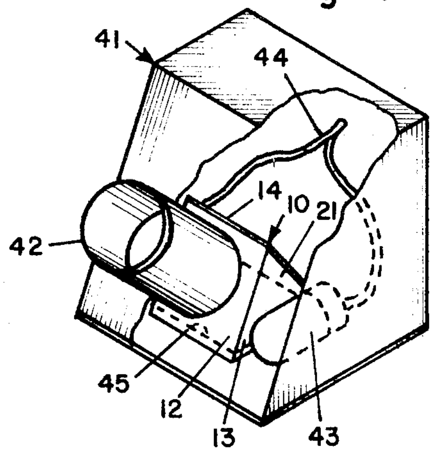
FIG. 6 is a perspective view of apparatus for illuminating and observing fingerprints, with portions cut away.

Fingerprint viewing apparatus incorporating features described above and illustrated in FIGS. 1 and 2 is shown in FIG. 6. Housing 41, shown partially broken away, serves to support prism 10 relative to direct viewing eyepiece 42. Light source 43 is located on one side of the prism, although two sources may be used. Light source 43 is located so as to illuminate the inside of prism 10 by passing through side face 21 with the other light source (not shown) passing through the opposite side face (face 22, FIG. 1). Electrical leads 44 connect the light sources to a suitable power source (not shown).

Opening 45, in the bottom of housing 41, exposes the total reflection face 13 so that a subject's finger, fingers, palm, etc. can be lightly pressed against the outside of this surface and fingerprints observed through eyepiece 42.

Figure 7:
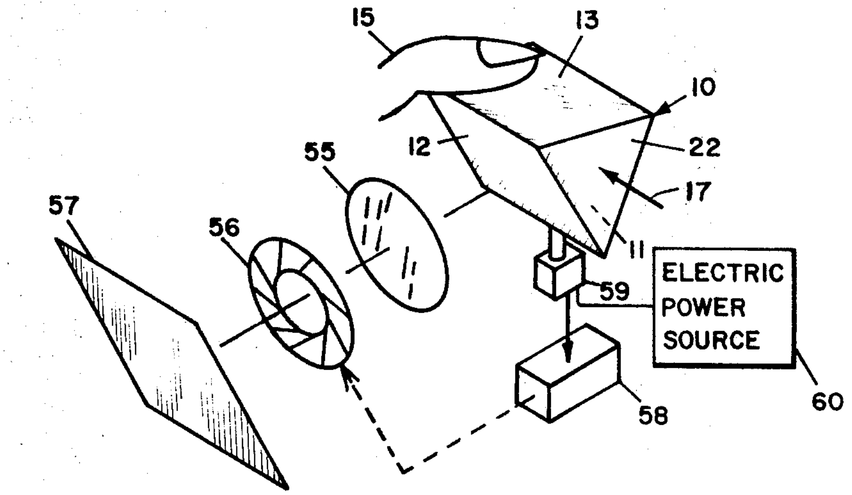
FIG. 7 is a perspective optical schematic view of apparatus for photographically recording fingerprints.

FIG. 7 is an optical, schematic illustration combining the operation of the fingerprint viewing prism 10 with the principal elements of a camera. The camera is represented by lens 55, shutter 56 and film 57. The shutter is controlled by actuator 58 which is electrically energized via microswitch 59, by electric power source 60.

In operation, when finger 15 touches surface 13 of prism 10, microswitch 59 is closed, energizing actuator 58 to open the camera shutter 56 and focus the image of the fingerprint by means of lens 55 onto film 56. Switch 59 and actuator 58 maintains shutter 56 in an open condition as long as the finger presses prism 10. While shutter 56 is open, if desired, the finger can be rolled across surface 13, as in conventional fingerprinting practice, and so long as light pressure is kept on prism 10, microswitch 59 will remain closed and shutter 56 will remain open. Thus, it is entirely feasible to obtain an image of a rolled print which has been recorded on film 57.

Generally, it will take no more than a second or less than one third of a second to roll a finger from one side to the other. Accordingly, the time of exposure of the film will not vary more than a factor of three or four. This range of exposure time for the selected film poses no problem, because the fingerprint as observed by the camera is a white on black image; there are no grays. Where no part of the finger touches surface 13, it is black and the ridges which touch the surface 13 either appear as white or not at all. For this reason, overexposure of the film by a factor of three, four or more will not appreciably affect the quality of the picture. Black, if overexposed, is still black, and white, if overexposed, is still white.

Figure 8:
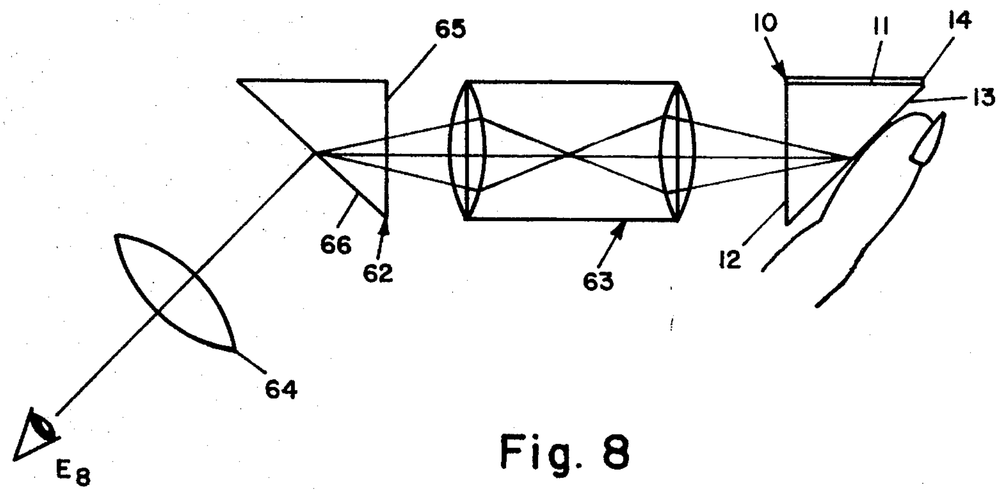
FIG. 8 is an optical schematic for eliminating certain distortion in fingerprint observing and recording apparatus.

The photograph or image of the fingerprint obtained with apparatus described above may, in some instances appear distorted, particularly when surfaces 12 and 13 are not parallel. This distortion may be corrected, as shown in FIG. 8, by employing a second prism 62 and optical system 63 between prism 10 and eyepiece 64. Prism 62 is reversed in orientation relative to prism 10 so that the light image of the fingerprint enters face 65 (which is equivalent to face 12 of prism 10) and leaves face 66 (which is equivalent to faces 13 of prism 10). Thus, the shortened fingerprint image which emerges from prism 10 is elongated as it passes through prism 62 and thus presents a more normal image.

Optical system 63 and eyepiece 65 may be so designed that an observer at E8 perceives the diffusive parts of surface 13 which appear to be transverse to his view due to the compensation by prism 62.

Optical system 63 may also be designed so that an image appearing on surface 13 may be focused on surface 66. In this case, surface 66 is preferably frosted while eyepiece 64 enables the viewer E8 to perceive an enlarged view of surface 66.

The numerous embodiments of the invention described herein are directed toward methods and apparatus for observing and photographing fingerprints and the like, as these embodiments represent most likely uses of the invention. However, it should now be obvious to those skilled in the art that the invention is also applicable for observing other irregularities or relief patterns in any surface which, when brought in contact with a surface of a prism, will produce diffused reflection at the points of contact to reveal a white pattern on a black background.

While there has been described what is presently considered the preferred embodiments of the invention, it should now be obvious to those skilled in the art that various other changes and modifications may be made therein without departing from the inventive concept contained herein, and it is, therefore, aimed to cover all such other changes and modifications that may fall within the true spirit and scope of the invention.

What I claim is:

1. Apparatus for observing the protruding and recessed patterns of a fingerprint, comprising:

transparent prism means having:

(i) a plurality of plane, lateral surfaces arranged so that the edges of adjacent surfaces touch and define a plurality of parallel lines, at least first and second surfaces of which define an acute angle therebetween; and (ii) a pair of end surfaces disposed parallel to each other and perpendicular to each of the plurality of lateral surfaces;

a source of illumination;

means directing the illumination into and through the prism means, normal to the end surfaces, and parallel to the lateral surfaces;

the first surface for receiving a fingerprint to be observed;

the second surface for observing the underside of the first surface; and light absorbing means on the remainder of the lateral surfaces.

2. The device as defined in claim 1, wherein:

the first surface is substantially internally totally reflective to light received through the second surface.

3. The device as defined in claim 2, wherein:

the light absorbing means is a coating of substantially the same refractive index as the transparent prism means.

4. The device as defined in claim 3, further comprising:

interface means formed between the points of contact of the protruding portions of the fingerprint, on the first surface, when the protruding portions of the fingerprint contact the first surface, the interface means diffusely reflecting portion of the internal incident light toward and through the second of the two surfaces which defines the acute angle;

whereby the protruding portions thereof appear light with respect to the recessed portions thereof which appear dark.

5. The device as defined in claim 4, wherein:

the acute angle between the first and the second of the two surfaces is about 50°; and the index of refraction of the transparent prism means is at least $\sqrt{2}$ or greater.

6. The device as defined in claim 5, wherein:

the prism means is a triangular prism.

7. The device as defined in claim 5, wherein:

the prism means is a right triangular prism.

8. The device as defined in claim 5, wherein:

the prism means is a polygonal prism.

References Cited

UNITED STATES PATENTS 3,200,701 8/1965 White.

FOREIGN PATENTS 638,249 1962 Italy.

RONALD L. WIBERT, Primary Examiner

W. A. SKLAR, Assistant Examiner

U.S. Cl. X.R.

356—156, 164